United States Patent [19]
Kajiwara et al.

[11] Patent Number: 5,315,588
[45] Date of Patent: May 24, 1994

[54] METHOD OF CONTROLLING FRAME-RELAY MODULE, AND HIGH-SPEED SWITCHING SYSTEM

[75] Inventors: Yasuhiro Kajiwara; Shigehiko Yazawa, both of Kawasaki, Japan

[73] Assignee: Fujitsu Limited, Kawasaki, Japan

[21] Appl. No.: 117,448

[22] Filed: Sep. 7, 1993

[30] Foreign Application Priority Data

Mar. 19, 1993 [JP] Japan .................................. 5-059992

[51] Int. Cl.⁵ .............................................. H04J 3/26
[52] U.S. Cl. .................................. 370/60.1; 370/94.2
[58] Field of Search ................. 370/60, 60.1, 85.9, 370/85.13, 85.14, 94.1, 94.2, 110.1

[56] References Cited

U.S. PATENT DOCUMENTS

| | | | |
|---|---|---|---|
| 5,101,404 | 3/1992 | Kunimoto et al. | 370/60 |
| 5,144,619 | 9/1992 | Munter | 370/60.1 |
| 5,204,857 | 4/1993 | Obara | 370/60 |
| 5,237,564 | 8/1993 | Lespagnol et al. | 370/60.1 |
| 5,241,536 | 8/1993 | Grimble et al. | 370/60.1 |

*Primary Examiner*—Douglas W. Olms
*Assistant Examiner*—Melvin Marcelo

[57] ABSTRACT

A method of controlling a frame-relay module includes steps of outputting a control-information frame from a control unit connected to an ATM switch, the control-information frame containing data specifying a frame-relay interface circuit as well as a processing command, assembling the control-information frame into an ATM cell and sending the ATM cell, via the ATM switch, to a frame-relay module in which the specified frame-relay interface circuit is present, restoring the ATM cell to a control-information frame by an ATM interface circuit and a cell assembly/disassembly circuit contained in the frame-relay module, causing the specified frame-relay interface circuit to accept the control-information frame, and executing processing, which conforms to the command contained in the control-information frame, in the frame-relay interface circuit.

10 Claims, 10 Drawing Sheets

LPT₁

| DLCI | PA | VPI/VCI | DPA | LA |
|------|----|---------|-----|-----|
| d1 | #a | 0 | 0 | #11 |
| d2 | 0 | #n | #b | #12 |
| d3 | #c | 0 | 0 | #13 |
| --- | --- | --- | --- | --- |

① (row 1)
② (row 3)

FIG.10(b)

LPT₂

| LA | DLCI |
|----|------|
|    |      |
|    |      |
| ⋮  | ⋮    |

FIG.11(a)  FIG.11(b)  FIG.11(c)

METHOD OF CONTROLLING FRAME-RELAY MODULE, AND HIGH-SPEED SWITCHING SYSTEM

BACKGROUND OF THE INVENTION

This invention relates to a method of controlling a frame-relay module, as well as a high-speed switching system. More particularly, the invention relates to a method of controlling a frame-relay module, as well as a high-speed switching system, in which predetermined processing is executed upon transmitting/receiving a control-information frame, via an ATM switch, between a control apparatus and the controller of a frame-relay interface circuit.

A frame relay (FR) is a transmission/switching technique suited to applications in which a large quantity of data is communicated in instantaneous fashion, namely applications in which data is communicated in bursts. A frame relay is especially suited to transmission/switching of data between LANs, which serve as fast busses. Further, since identification of a party in frame units and multiplex communication are realized, a communication line can be utilized very efficiently. More specifically, control information (a data link connection identifier, abbreviated to "DLCI") for identifying a frame is added to the header of an FR frame. Since a network is informed of a destination using the DLCI in each frame, frames having DLCIs of different values can be sent in continuous fashion, whereby a frame multiplex function is realized.

Figure 8:
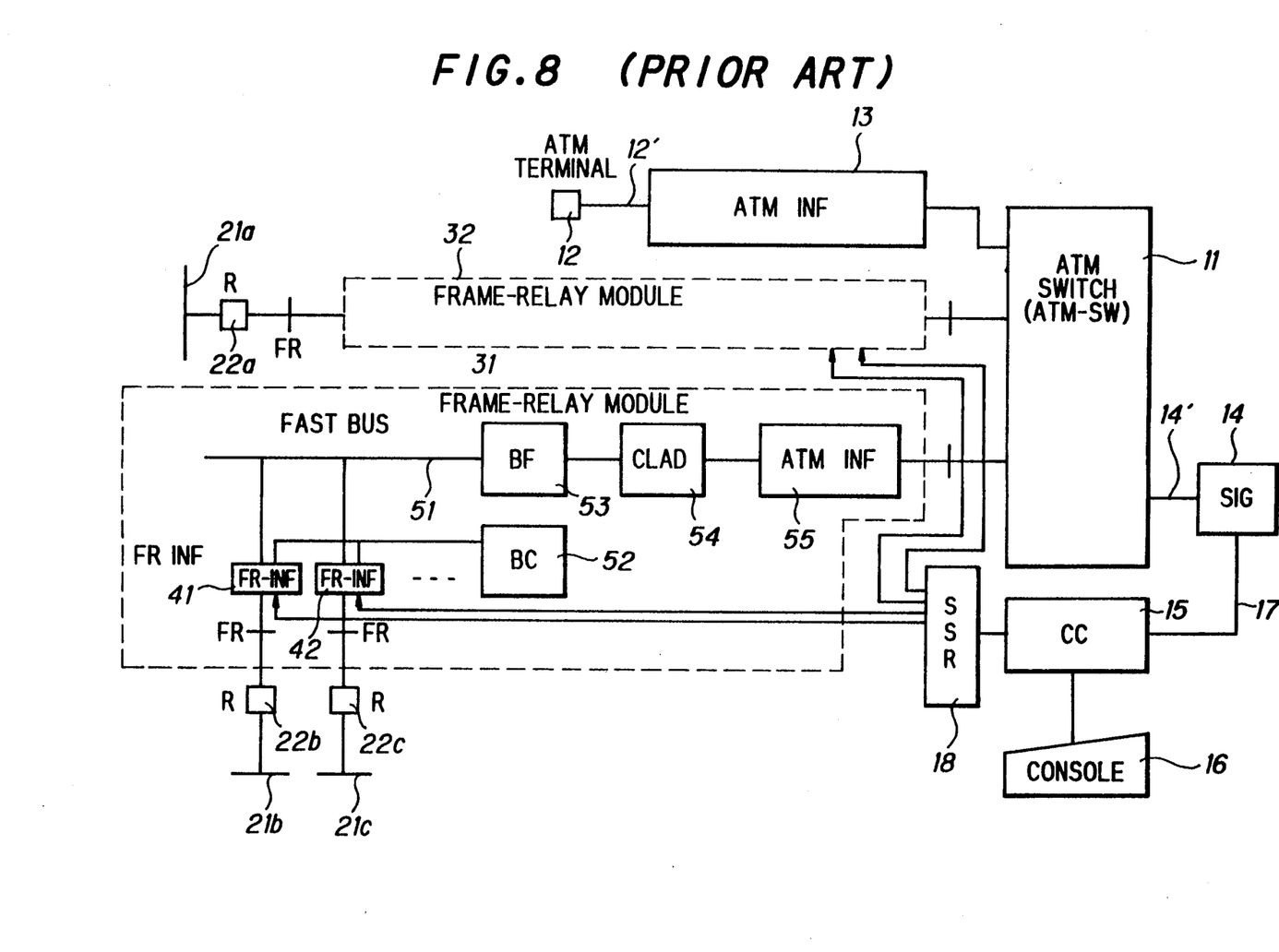
FIG. 8 is a block diagram illustrating a high-speed switching system having a frame-relay module according to the prior art.

FIG. 8 is a block diagram illustrating a high-speed switching system having frame-relay modules. This is an example in which frames are transmitted via an ATM network. The system includes an ATM switch (ATM-SW) 11, an ATM terminal 12 and an ATM interface circuit (ATM-INF) 13. The ATM interface circuit 13 has a routing table (not shown). When an ATM cell enters the ATM interface circuit 13 from an incoming line 12', the circuit 13 replaces the VCI (virtual channel identifier) of the ATM cell based upon the routing table, adds routing information and then sends the ATM cell to the ATM switch 11. Further, the ATM interface circuit 13 removes routing information that has been added to an ATM cell inputted from the ATM switch 11 and then outputs the ATM cell to the line 12' on the side of the ATM terminal.

An ATM signaling unit (SIG) 14 is provided in the exit port of the ATM switch 11, and a processor (CC) 15 executes call processing as well as other processing. A bus line 17 connects the SIG 14 and the CC 15. A serial interface circuit (SSR) 18 allows a serial exchange of data with an FR interface circuit, described later. Each ATM terminal 12 (only one is shown in FIG. 8) is set beforehand to a signal VCI. In addition, the routing table within the ATM interface 13 is set to routing information, in correlation with the signal VCI, for routing a cell having this VCI to an outgoing line 14'.

When the ATM terminal 12 performs a call operation for calling a terminating terminal, a cell assembling unit within the ATM terminal 12 subdivides data, which includes the originating number, the terminating number, the type of terminal and attributes, etc., into cell units, produces a signal cell upon attaching a signal VCI to each item of subdivided data and applies the signal cell to the ATM interface 13. The latter adds routing information, which is for routing the cell to the outgoing line 14', and then sends the cell to the ATM switch 11. When the signal cell is sent to the ATM switch 11, the latter routes the signal cell to the outgoing line 14' based upon the routing information, whereby the signal cell is fed into the signaling unit 14. Upon receiving the signal cell, the signaling unit 14 assembles (forms into a frame) the information contained in the signal cell and informs the processor 15. The latter executes call processing such as caller service analysis, billing processing and terminating-numeral translation processing. The processor 15 also decides a virtual path identifier (VPI) and virtual channel identifier (VCI) and sends connection information, which includes the originating number, the terminating number, the VPI, VCI and other data to a trunk ATM exchange (not shown) via a signal network (not shown). The trunk exchange subsequently performs similar processing. A path to the ATM exchange to which the terminating terminal has been connected is eventually established and the data cell from the ATM terminal 12 is transmitted to the ATM terminal on the terminating side via the path established.

Numerals 21a, 21b, 21c . . . denote fast busses, e.g., LANs (local area networks), and numerals 22a, 22b, 22c, . . . denote FR routers (R). Each FR router refers to an internal protocol address (IP address) contained in the frame sent from the terminal accommodated by the LAN, obtains the DLCI and adds the DLCI to the frame. Further, the FR router eliminates the DLCI attached to a frame that enters from the side of a frame-relay module, described later, and outputs the frame to the LAN side.

Numerals 31, 32 . . . denote frame-relay modules provided between the FR routers and the ATM switch 11. The frame-relay modules are identically constructed. Each module includes frame-relay interface circuits (FR-INF) 41, 42 . . . . Each FR-INF adds logical-path information to the frame that enters from the FR router (R). Further, each FR-INF accepts a frame sent to it via the ATM switch 11 and sends the frame to the FR router. A fast bus 51 interconnects the plurality of FR interface circuits 41, 42, . . . , each of which is assigned a predetermined port address (PA). A bus controller (BC) 52 performs contention control (control of the right to use the bus) of the bus, a buffer (assigned a port address 0) 53 is connected to the fast bus 51, and a CLAD (cell assembly/disassembly) circuit 54 assembles a frame into a cell and disassembles an ATM cell into a frame. An ATM interface circuit 55 replaces the VCI of an ATM cell that has entered from the CLAD circuit 54, adds routing information to the cell and inputs the cell to the ATM switch 11. Further, the ATM interface circuit 55 eliminates routing information from an ATM cell that has entered from the ATM switch and then inputs the cell to the CLAD circuit 54.

Figure 9:
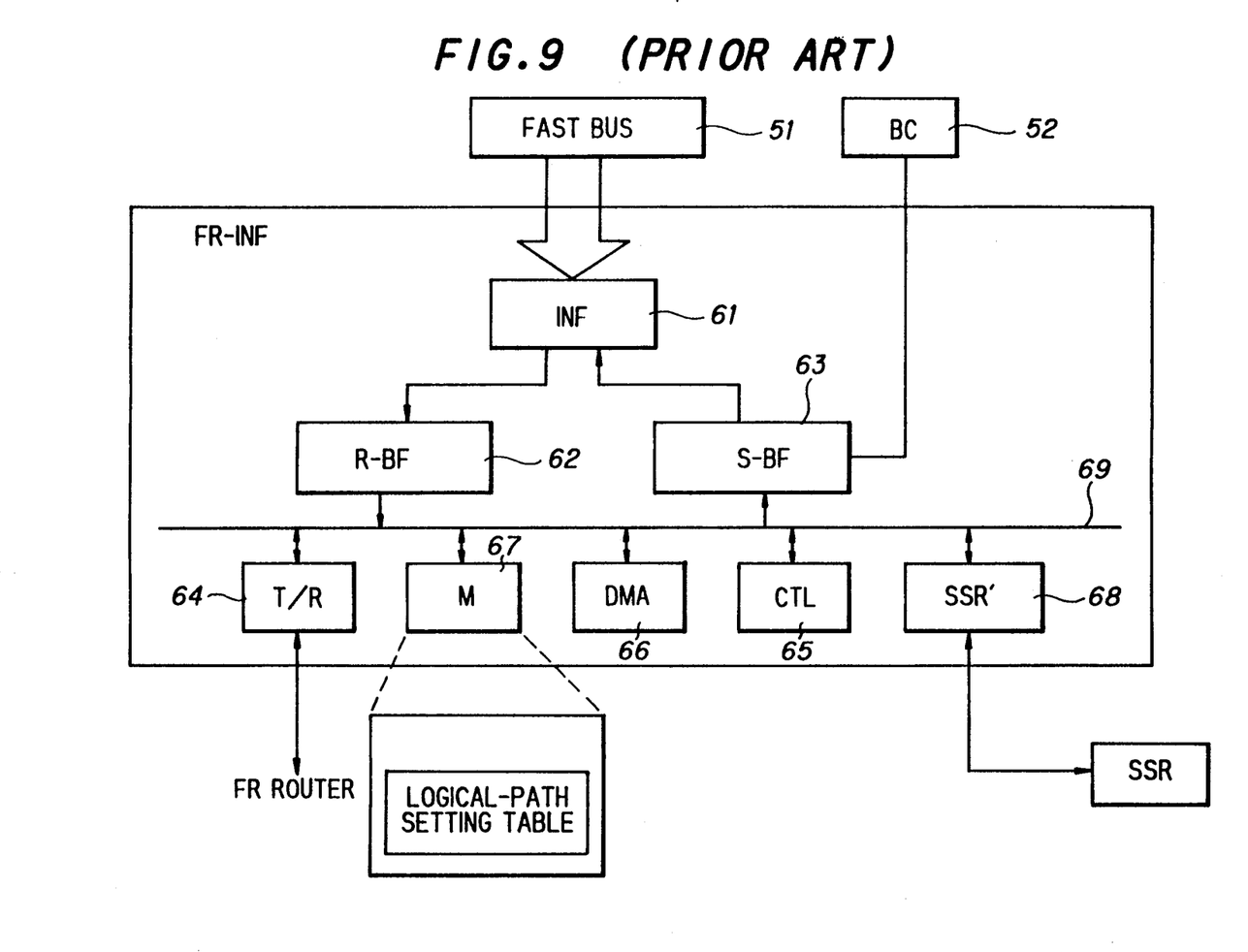
FIG. 9 is block diagram illustrating a frame-relay interface circuit according to the prior art.

The FR interface circuits 41, 42 are constructed as shown in FIG. 9. Specifically, each FR interface circuit includes a bus interface 61, a reception buffer (B-BF) 62, a transmission buffer (S-BF) 63, a transmitter/receiver (T/R) 64 for performing an exchange of frames with the FR router, a processor (CTL) 65, a direct memory access controller (DMA) 66, a memory (M) 67, a serial interface circuit (SSR') 68 and a bus 69. A logical-path setting table LPT is stored in the memory 67.

Figure 10A:
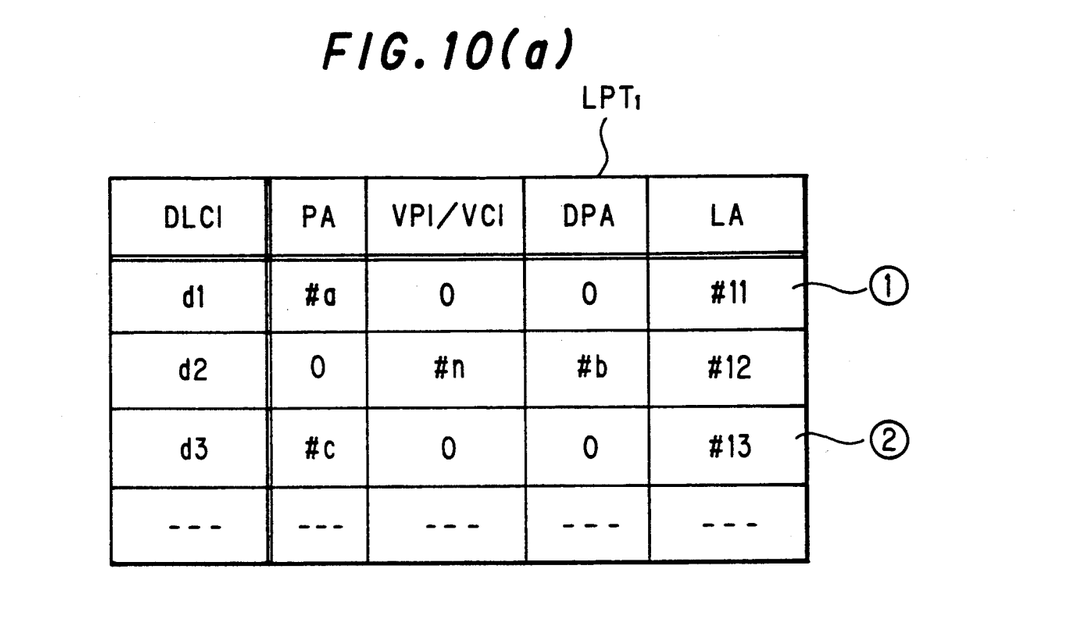
FIGS. 10a–b are a diagram illustrating a logical-path setting table.
Figure 10B:
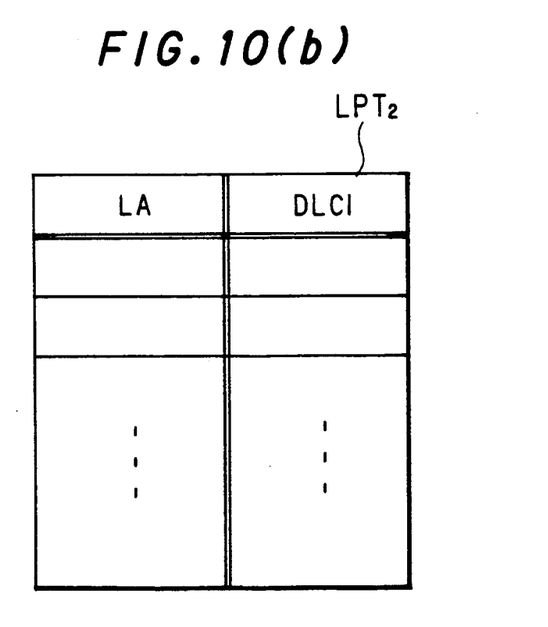

As shown in FIGS. 10(a), (b), the logical-path setting table LPT has · · a first table LPT₁ showing the correlation between DLCI values appended to frames entered from the FR router and logical path data (PA, VPI/VCI, DPA, LA), and ≠ a second table LPT$_2$ storing the correspondence between link addresses LA, which contained in frames sent from a party via the ATM switch, and DLCI values.

In the first table LPT$_1$, "PA" represents the port addresses (the port address of a buffer is 0) of the FR interface circuits 41, 42, ... and buffer 53 within a frame-relay module on the originating side; "VPI/VCI" represents a virtual path identifier/virtual channel identifier; "DPA" represents a destination port address specifying an FR interface circuit within a frame-relay module at the destination; and "LA" represents internal information (link address) which, when a frame has reached a party, is for achieving linkage with regard to the particular DLCI value to which a conversion is to be made. In the second table LPT2, "LA" represents a link address contained in a frame sent from a party via the ATM switch.

In a case (intra-FRM connection) where a frame is transmitted to another LAN without the intermediary of the ATM switch 11, VPI/VCI and DPA corresponding to the DLCI value of the frame are both made 0 (see ··, ≠) and the port address PA is made a port address #a, #b, ... of the FR interface circuit corresponding to the LAN of the frame destination. On the other hand, in a case (external FRM connection) where a frame is transmitted via the ATM switch 11, the port address PA is made 0 (port address of buffer 53).

Figure 11A:
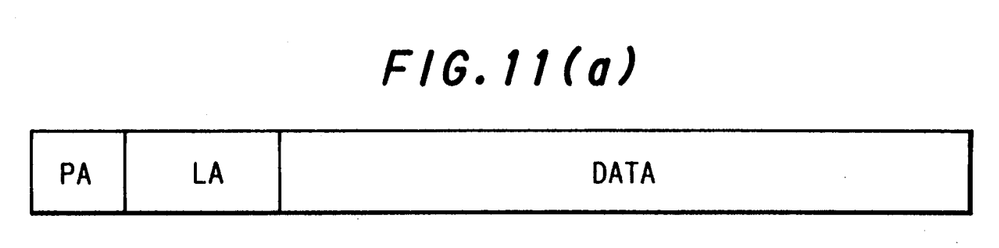
FIGS. 11a–c are a diagram illustrating the structure of frames on a fast bus.
Figure 11B:
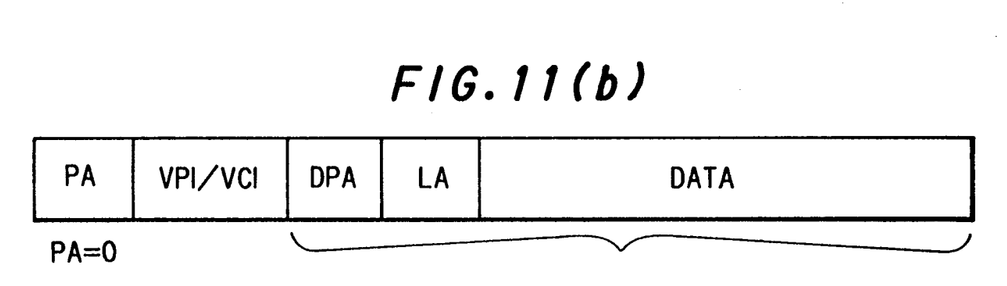

When the processor 65 receives a frame with an attached DLCI value from the FR router, the processor 65 refers to the first table LPT$_1$ to obtain the logical path data, removes the DLCI of the frame, adds the logical path data obtained and then transmits the frame. More specifically, in the case of the intra-FRM connection, as shown in FIG. 11(a), solely the port address PA and link address LA are added on. In the case of the external FRM connection, as shown in FIG. 11(b), the port address (=0), VPI/VCI, destination port address DPA and link address LA are added on.

Intra-FRM connection

In a case where a frame is transmitted from the terminal of LAN 21b (FIG. 8) to the terminal of the LAN 21c, by way of example, the FR router 22b adds the DLCI value conforming to the terminating destination to the frame and then inputs the frame to the FR interface circuit 41. The latter then refers to the logical-path setting table LPT and sends a frame having the construction shown in FIG. 11(a) to the fast bus 51. It should be noted that the port address PA is the port address of the FR interface circuit 42 ....

Each of the FR interface circuits 41, 42, performs monitoring to determine whether the port address PA of a frame coincides with its own port address. If coincidence is found, then the FR interface circuit receives the frame. As a result, the frame is received by the FR interface circuit 42. The FR interface circuit 42 refers to the second table LPT$_2$ and obtains a DLCI value from the link address LA contained in the received frame. The originating party can be identified from this DLCI value. The FR interface circuit 42 then removes the logical path data (PA, LA), attaches the DLCI value instead and then sends the frame to the FR router 22c. The latter removes the DLCI value and transfers the frame to the LAN 21c. The terminal whose address coincides with the IP address contained in the frame receives the frame.

External FRM connection

Figure 11C:
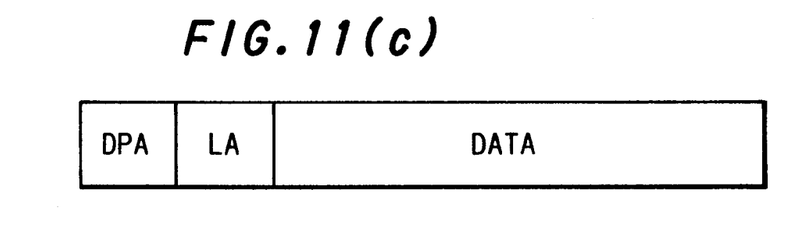

In a case where a frame is transmitted from the terminal of the LAN 21b to the terminal of the LAN 21a, by way of example, the FR router 22b adds the DLCI value conforming to the terminating destination to the frame and then inputs the frame to the FR interface circuit 41. The latter then refers to the logical-path setting table LPT and sends a frame having the construction shown in FIG. 11(b) to the fast bus 51. It should be noted that the port address PA is 0. The buffer 53 accept frames for which the port address PA is 0 and successively buffers frames for every identical destination (every identical VPI/VCI). The CLAD circuit 54 forms cells by gathering together the DPA, LA and data of the frames for every identical destination, adds the VPI/VCI to the header and then inputs the cell to the ATM interface circuit 55. The latter replaces the VCI of the ATM cell entering from the CLAD circuit 54, adds routing information to the cell and then inputs the cell to the ATM switch 11. The ATM switch 11 routes the ATM cell to the frame-relay module 32 based upon the routing information and inputs the cell to the ATM interface circuit of this module. The ATM interface circuit of the frame-relay module 32 inputs the cell to the CLAD circuit upon removing the routing information, and the CLAD circuit disassembles the inputted ATM cell into a frame, as shown in FIG. 11(c) and then outputs the frame to the fast bus via the buffer. This is performed in successive fashion. Thereafter, the DPA in FIG. 11(c) becomes the port address PA. In a manner similar to that for the case of the intra-FRM connection, this is accepted by the prescribed FR interface circuit, the DLCI value is added and the frame is inputted to the FR router 22a. The latter transfers the frame to the LAN 21a upon removing the DLCI value, and a terminal whose address coincides with the IP address contained in the frame receives the frame.

Thus, in the frame relay (FR), a logical-path setting table LPT is set in each FR interface circuit in advance, a logical path is established upon referring to the logical-path setting table and a frame is transmitted to the other party via the path. Consequently, when a change in a subscriber occurs, as when there is a new subscriber, it is necessary to change the logical-path data in the table LPT or register new logical-path data in the table. In order to change or register logical-path data, the FR interface circuit holding the logical-path setting table of interest is specified from the console 16, and a data-change/add/delete command and logical-path data are inputted to the control unit 15 from the console 16. The processor (control unit) 15 sends the command and logical-path data to the specified FR interface circuit via the serial interface circuit 18. The serial interface circuit (SSR') 68 of the FR interface circuit receives the data, and the processor 65 changes/adds/deletes logical-path data in the logical-path setting table LPT based upon the command. Further, the processor 65 sends a response to the command to the control unit 15 via the serial interface.

In order to change the logical-path setting table LPT, the conventional practice is such that the control-unit side must be provided with one serial interface circuit (SSR), and each FR interface circuit must be provided with a respective serial interface circuit (SSR'). As a result, there is a large amount of hardware. Moreover, a function for transmitting/receiving control signals via the serial interface is necessary, and the processing of the FR interface circuit becomes very complicated.

SUMMARY OF THE INVENTION

Accordingly, an object of the present invention is to provide a method of controlling a frame-relay module, as well as a high-speed switching system, in which it is possible to reduce the amount of hardware and simplify the processing of the FR interface circuit.

According to the present invention, the foregoing object is attained by providing a method of controlling a frame-relay module, comprising the steps of outputting a control-information frame from a control unit connected to a ATM switch, the frame including data specifying a frame-relay interface circuit as well as a processing command, assembling the control-information frame into an ATM cell and sending the ATM cell, via the ATM switch, to a frame-relay module in which the specified frame-relay interface circuit is present, causing the specified frame-relay interface circuit to accept the control-information frame via an ATM interface circuit and a CLAD circuit, and executing processing, which conforms to a command contained in the control-information frame, in the frame-relay interface circuit. In accordance with the method of controlling a frame-relay module according to the present invention, a serial interface circuit for exchanging data between the control unit and each FR interface circuit is unnecessary. Moreover, an exchange of control-information frames can be performed by hardware provided in an ATM switch as standard hardware. This makes it possible to reduce hardware.

Further, according to the present invention, the foregoing object is attained by providing a high-speed switching system comprising input means for entering a port address PA of a frame-relay interface circuit, data specifying a frame-relay module to which the frame-relay interface circuit belongs, a processing command and processing data, a control unit for creating and outputting a control-information frame containing a port address PA, a processing command and processing data, an ATM signaling unit for assembling the control-information frame into an ATM cell and adding a VPI/VCI, which conforms to the frame-relay module, to the ATM cell, an ATM switch for routing the ATM cell to a frame module based upon the VPI/VCI, means provided in the frame-relay module for sending the received control-information frame to a bus to which each frame-relay interface circuit is connected, and a frame-relay interface circuit, to which a port address has been assigned, for accepting a control-information frame containing a port address identical with the above-mentioned port address and executing processing conforming to a command contained in this control-information frame. In accordance with the high-speed switching system of the present invention, a serial interface circuit for exchanging data between the control unit and each FR interface circuit is unnecessary. Moreover, an exchange of control-information frames can be performed by hardware provided in an ATM switch as standard hardware. This makes it possible to reduce hardware.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT (a) Overview of the Invention

Figure 1:
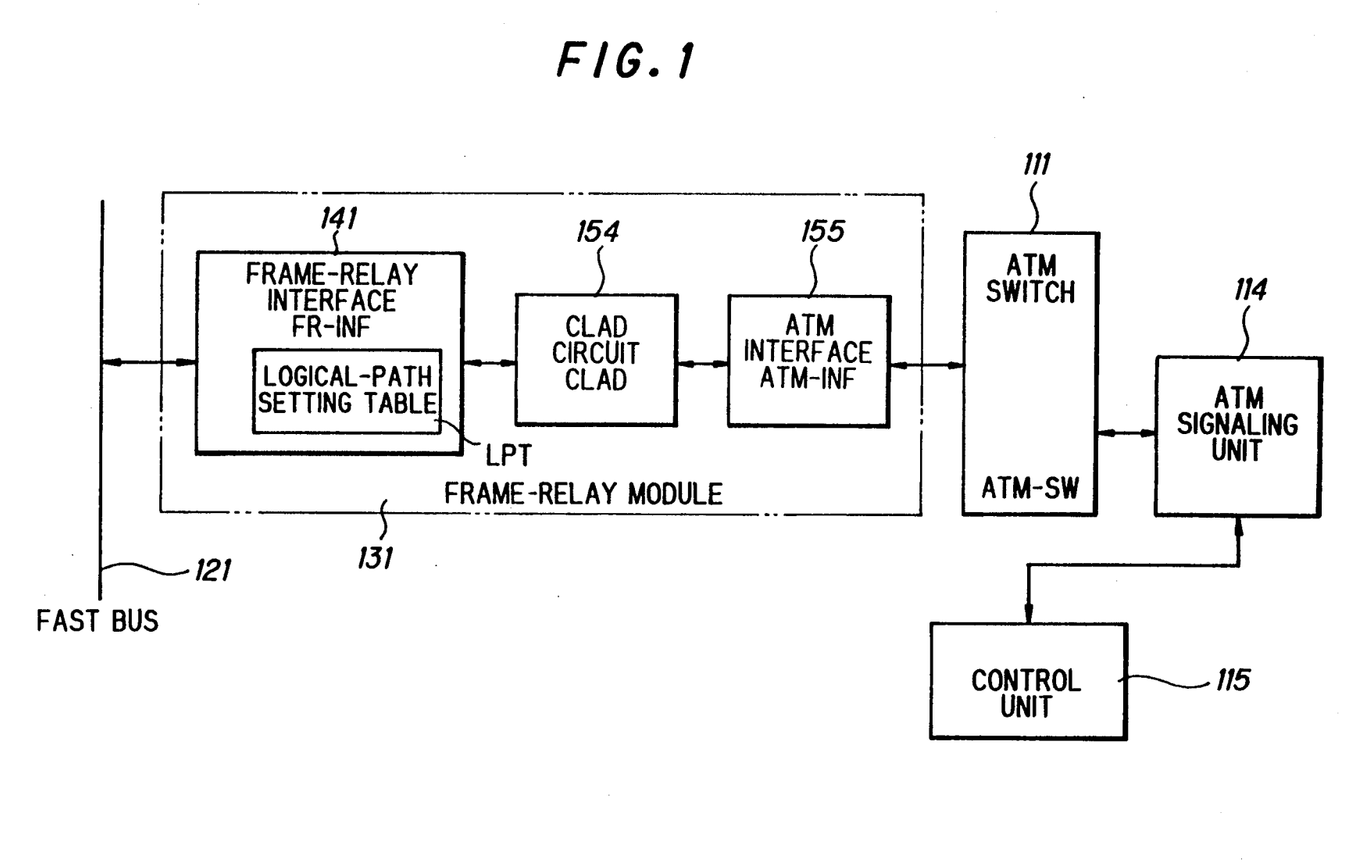
FIG. 1 is a block diagram for describing the principles of the present invention.

FIG. 1 is a block diagram for describing the principles of the present invention.

Shown in FIG. 1 are an ATM switch 111, an ATM signaling unit 114, a control unit 115 for performing call processing and processing for altering a logical-path setting table, a local fast bus 121 such as a LAN and a frame-relay module 131. The latter includes an FR interface circuit (FR-INF) 141 for adding logical-path information to a frame, which has entered from the local fast bus, upon referring to a logical-path setting table LPT, and for accepting a frame sent to it from another party and transmitting the frame to the local fast bus, a CLAD circuit 154 for assembling a frame into an ATM cell and disassembling an ATM cell into a frame, and an ATM interface circuit (ATM-INF) 155 for supervising interfacing with the ATM switch 111.

In a case where the FR interface circuit 141 is made to execute predetermined processing, the control unit 115 assembles a control-information frame, which contains data specifying the FR interface circuit 141, into an ATM cell and sends the ATM cell to the frame-relay module 131 via the ATM switch 111. The FR interface circuit 141 accepts the above-mentioned control-information frame and executes processing in accordance with the command contained in the control-information frame. For example, if the content of the logical-path setting table LPT possessed by the FR interface circuit 141 is altered, the control unit 115 assembles a control-information frame, which contains data specifying the FR interface circuit, a command and table contents, into an ATM cell and then sends the ATM cell to the frame-relay module 131 via the ATM switch. The FR interface circuit 141 accepts this control-information frame and alters the table contents in accordance with the command.

If this arrangement is adopted, a serial interface circuit for performing an exchange of data between the control unit and each FR interface circuit may be dispensed with. Moreover, an exchange of control-information frames can be performed by hardware provided in an ATM switch as standard hardware. This makes it possible to reduce hardware. Further, since it will suffice to distinguish a data frame from a control-information frame by an identifier, determine whether a frame is a data frame or control frame and then execute the prescribed processing, it is possible to simplify interface control.

(b) Embodiment of the Invention

Overall Configuration

Figure 2:
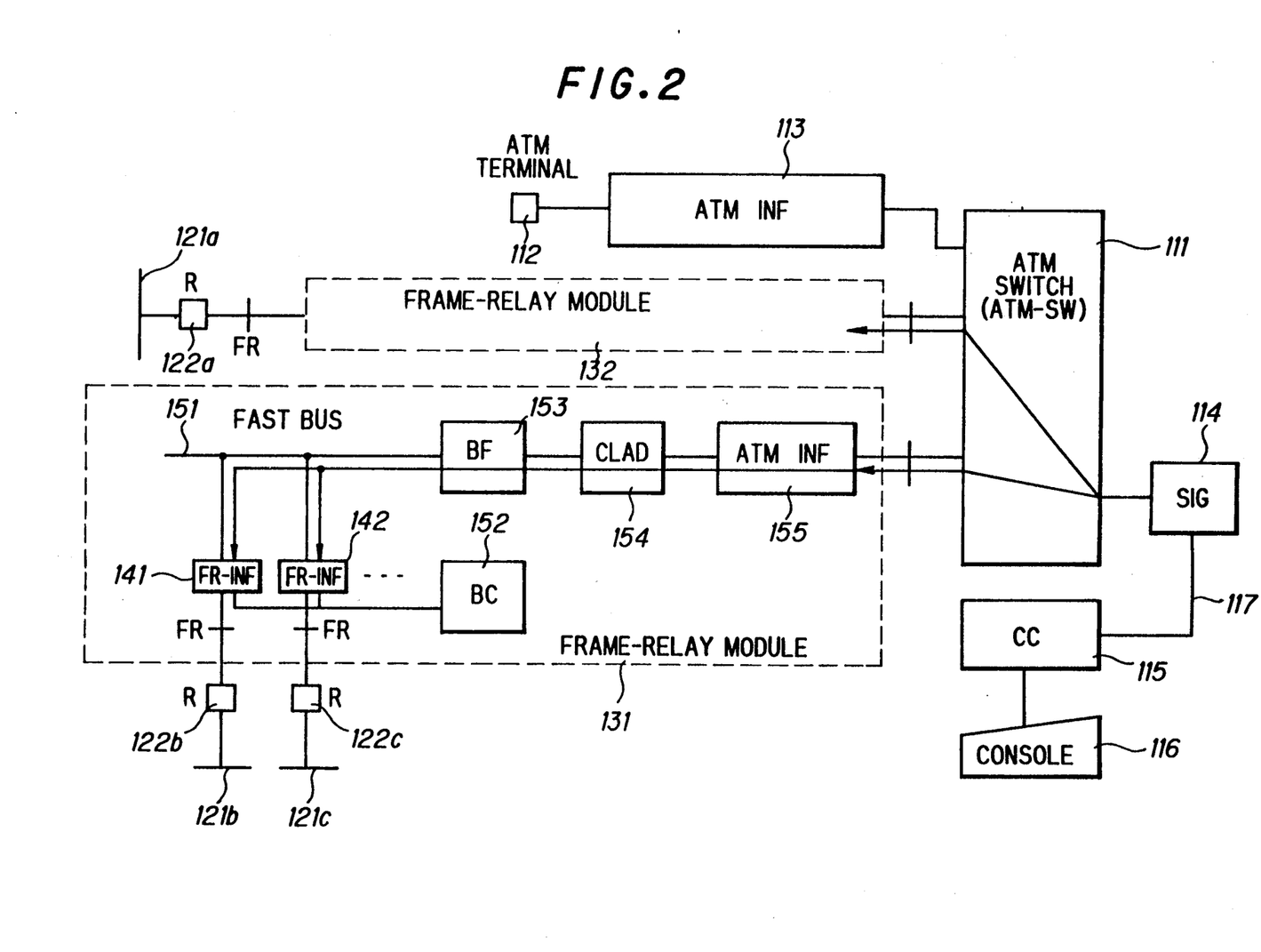
FIG. 2 is a block diagram illustrating an embodiment of the present invention.

FIG. 2 is a block diagram illustrating a high-speed switching system for practicing the method of controlling a frame-relay module according to the present invention. This is an example in which frames are transmitted via an ATM network. The system includes the ATM switch (ATM-SW) 111, an ATM terminal 112, an ATM interface circuit (ATM-INF) 113, the ATM signaling unit (SIG) 114 provided in the exit port of the ATM switch 111, the processor (CC) 115 for performing call and other processing, a maintenance console 116 and a bus line 117.

Numerals 121a, 121b, 121c ... denote fast busses, e.g., LANs, and numerals 122a, 122b, 122c, ... denote FR routers (R). Each FR router refers to an internal protocol address (IP address) of the terminating party contained in the frame sent from the terminal accommodated by the LAN, obtains the DLCI and adds the DLCI to the frame. Further, the FR router eliminates the DLCI attached to a frame that enters from the side of a frame-relay module, described later, and outputs the frame to the LAN side.

Figure 3:
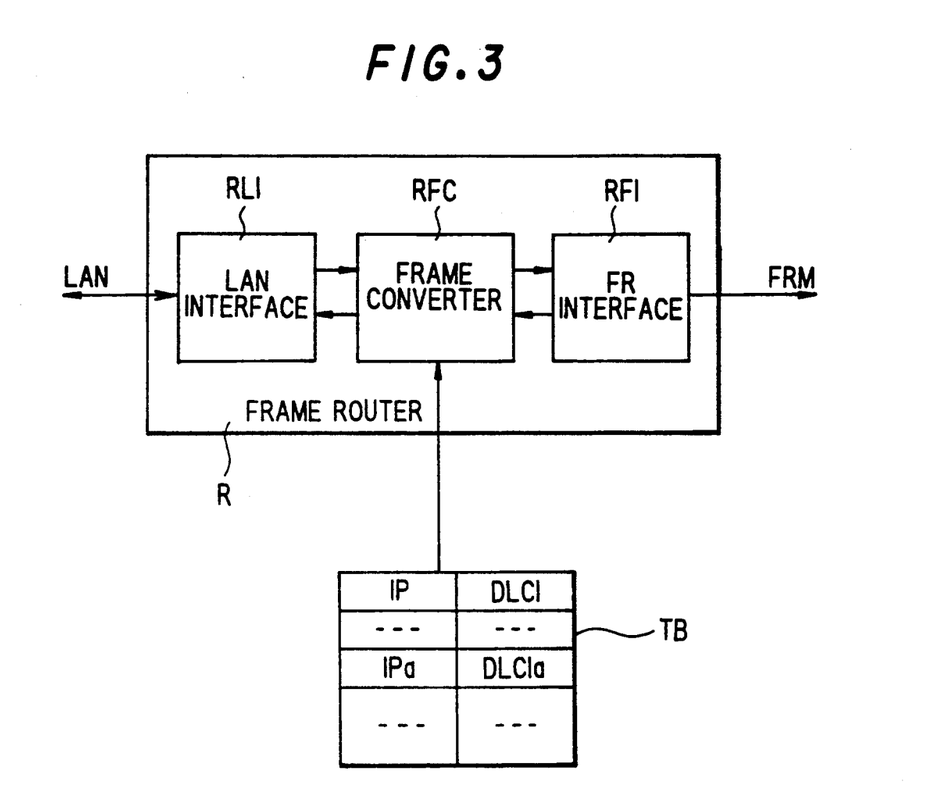
FIG. 3 is a block diagram of an FR router.
Figure 4:
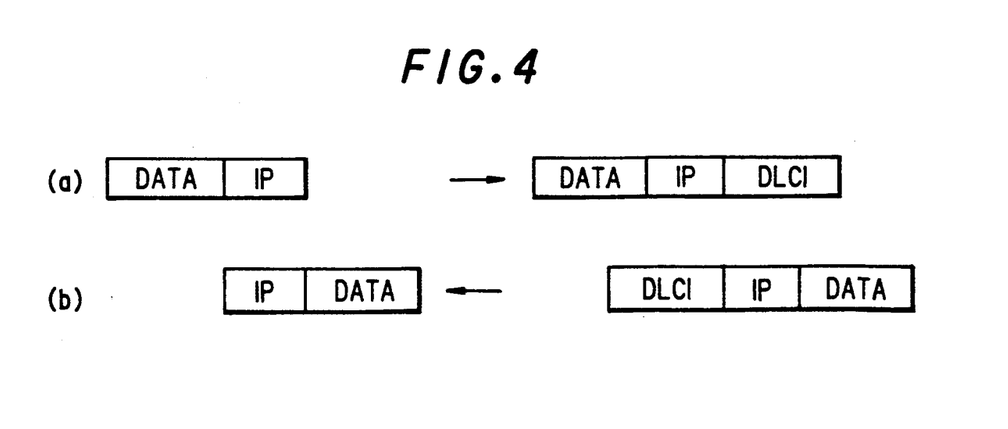
FIG. 4 is a diagram for describing the operation of the FR router.

As shown in FIG. 3, each FR router has a LAN interface RLI, a frame converter RFC and a frame-relay interface RFI. The frame converter RFC has a correspondence table TB giving the correspondence between IP addresses and DLCIs. The frame converter RFC obtains the DLCI corresponding to the IP address contained in the frame entering from the LAN and adds the DLCI to the frame [see FIG. 4(a)]. In addition, the frame converter RFC removes the DLCI added to a frame that has entered from the frame-relay module FRM [see FIG. 4(b)].

With reference again to FIG. 2, numerals 131, 132 . . . denote frame-relay modules (FRM) provided between the FR routers and the ATM switch 111. The frame-relay modules are identically constructed. Each module 131, 132 . . . includes FR interface circuits (FR-INF) 141, 142 . . . . Each FR-INF adds logical-path information to the frame that enters from the FR router (R). Further, each FR-INF accepts a frame sent to it via the ATM switch 111 and sends the frame to the FR router. A fast bus 151 interconnects the plurality of FR interface circuits 141, 142, . . . , each of which is assigned a predetermined port address (PA). A bus controller (BC) 152 performs contention control of the bus, a buffer (assigned a port address 0) 153 is connected to the fast bus 151, and a CLAD circuit 154 assembles a frame into a cell and disassembles an ATM cell into a frame. An ATM interface circuit 155 replaces the VCI of an ATM cell that has entered from the CLAD circuit 154, adds routing information to the cell and inputs the cell to the ATM switch 111. Further, the ATM interface circuit 155 eliminates routing information from an ATM cell that has entered from the ATM switch 111 and then inputs the cell to the CLAD circuit 154.

Construction of FR Interface Circuit

Figure 5:
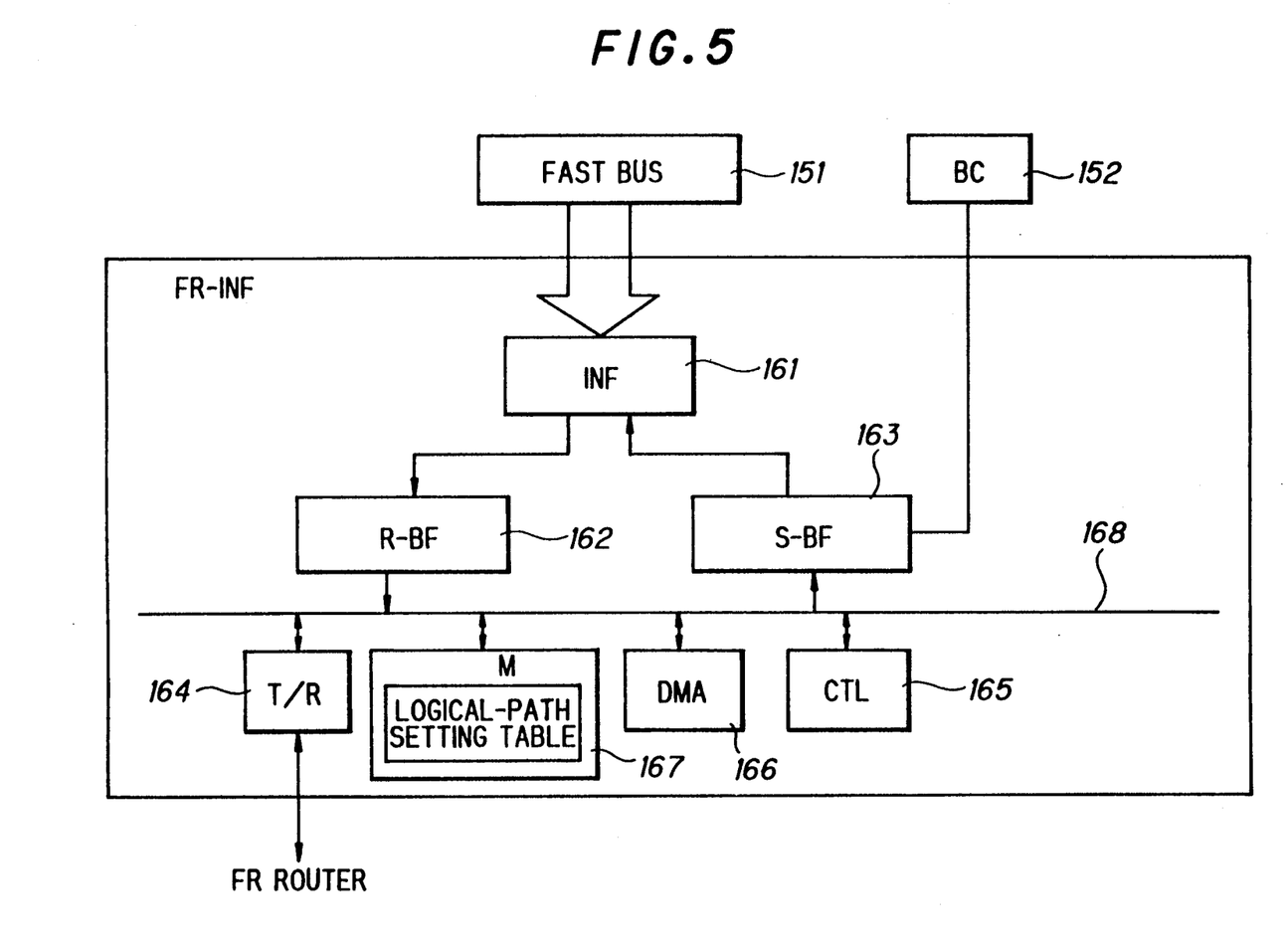
FIG. 5 is a block diagram illustrating an FR interface circuit according to the present invention.

The FR interface circuits (INF) 141, 142 are constructed as shown in FIG. 5. Specifically, each FR interface circuit includes a bus interface 161, a reception buffer (B-BF) 162, a transmission buffer (S-BF) 163, a transmitter/receiver (T/R) 164 for performing an exchange of frames with the FR router, a processor (CTL) 165, a direct memory access controller (DMA) 166, a memory (M) 167 and a bus 168. A logical-path setting table LPT is stored in the memory 167. The logical-path setting table LPT has a constitution the same as that of the prior art [see FIGS. 10(a), (b)]. It is noteworthy that the FR interface circuit in FIG. 5 does not possess the serial interface circuit SSR', unlike the FR interface circuit (see FIG. 9) of the prior art.

Frame

A frame can be a data frame or a control frame and is identified by an identifier C/D assigned to the frame to distinguish one type of frame from another.

Figure 6A:
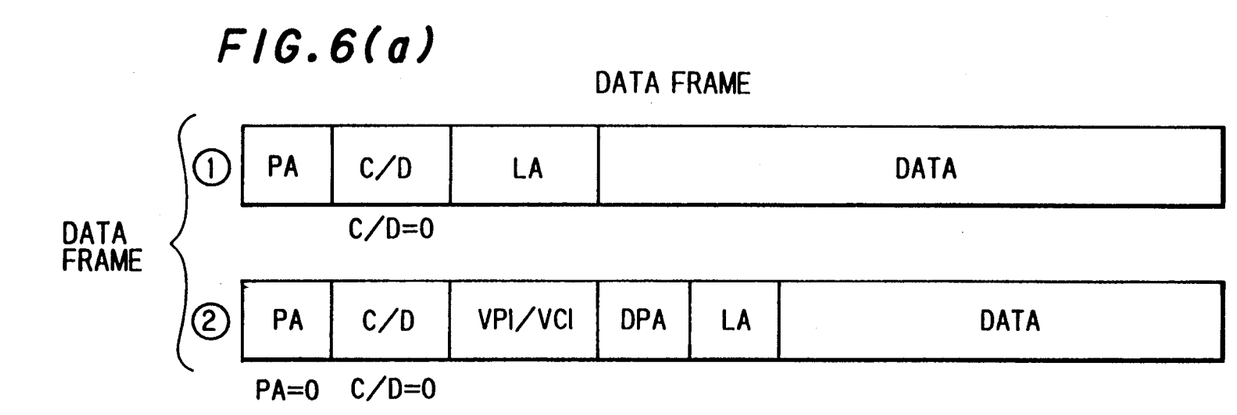
FIGS. 6a–b are a diagram for describing frames.

FIG. 6(a) is an explanatory view of a data frame, for which the identifier C/D is made "0". The other items of information in this frame have meanings similar to those in the prior art (see FIG. 11). More specifically, in a case (intra-FRM connection ··) where a data frame is transmitted to another LAN, which is accommodated in a frame-relay module, without the intermediary of the ATM switch 111, VPI/VCI and DPA are not added to this frame; only the port address PA and link address LA are added. The port address PA becomes the port address of the FR interface circuit corresponding to the LAN of the data-frame destination. In a case (external FRM connection ≠) where a frame is transmitted via the ATM switch 111, the port address PA, VPI/VCI, the destination port address DPA and the link address LA are added to the data frame. The port address PA becomes the port address (=0) of the buffer 153.

When the processor 165 of the FR interface circuit receives a frame with an attached DLCI value from the FR router, the processor 165 refers to the first table LPT₁ (see FIG. 10(a)) to obtain the logical path data, removes the DLCI, adds the logical path data obtained as well as the identifier C/D (=0) in place of the logical path data and then transmits the frame to the fast bus 151. More specifically, in the case of the intra-FRM connection, as shown at ·· in FIG. 6(a), the port address PA, link address LA and identifier C/D (=0) are added on. In the case of the external FRM connection, as shown in ≠ FIG. 6(a), the port address (=0), VPI/VCI, destination port address DPA, link address LA and identifier C/D (=0) are added on, and then the frame is sent to the fast bus 151.

Figure 6B:
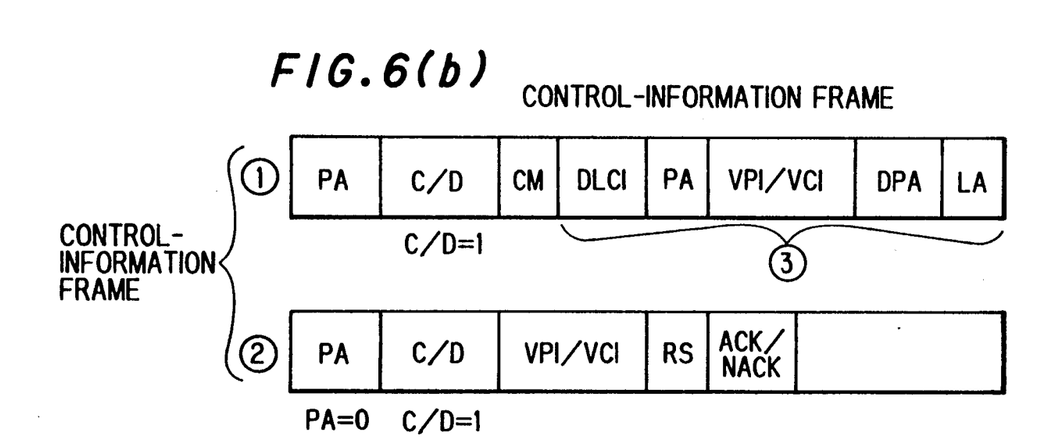

FIG. 6(b) is an explanatory view of control-information frames, for which the identifier C/D is made "1". A control-information frame ·· is a frame outputted by the control unit 115. This is an example of a frame for registering logical-path information in the logical-path setting table LPT. Further, PA at the head of the frame is the port address of the FR interface circuit having the logical-path setting table LPT in which logical-path information is registered; C/D is the identifier; CM is a command, e.g., a registration command; and a portion AF is newly registered content (logical-path information) of the logical-path setting table. A control-information frame ≠ is a control frame for response and is sent from the FR interface circuit. Further, PA at the head of the frame is the port address (=0) of the buffer 153; C/D is the identifier; VPI/VCI is the virtual path identifier/virtual channel identifier for a signal, and RS is the response to a command. ACK/NACK is information indicating execution/non-execution of a command.

ATM Signaling Unit

Figure 7:
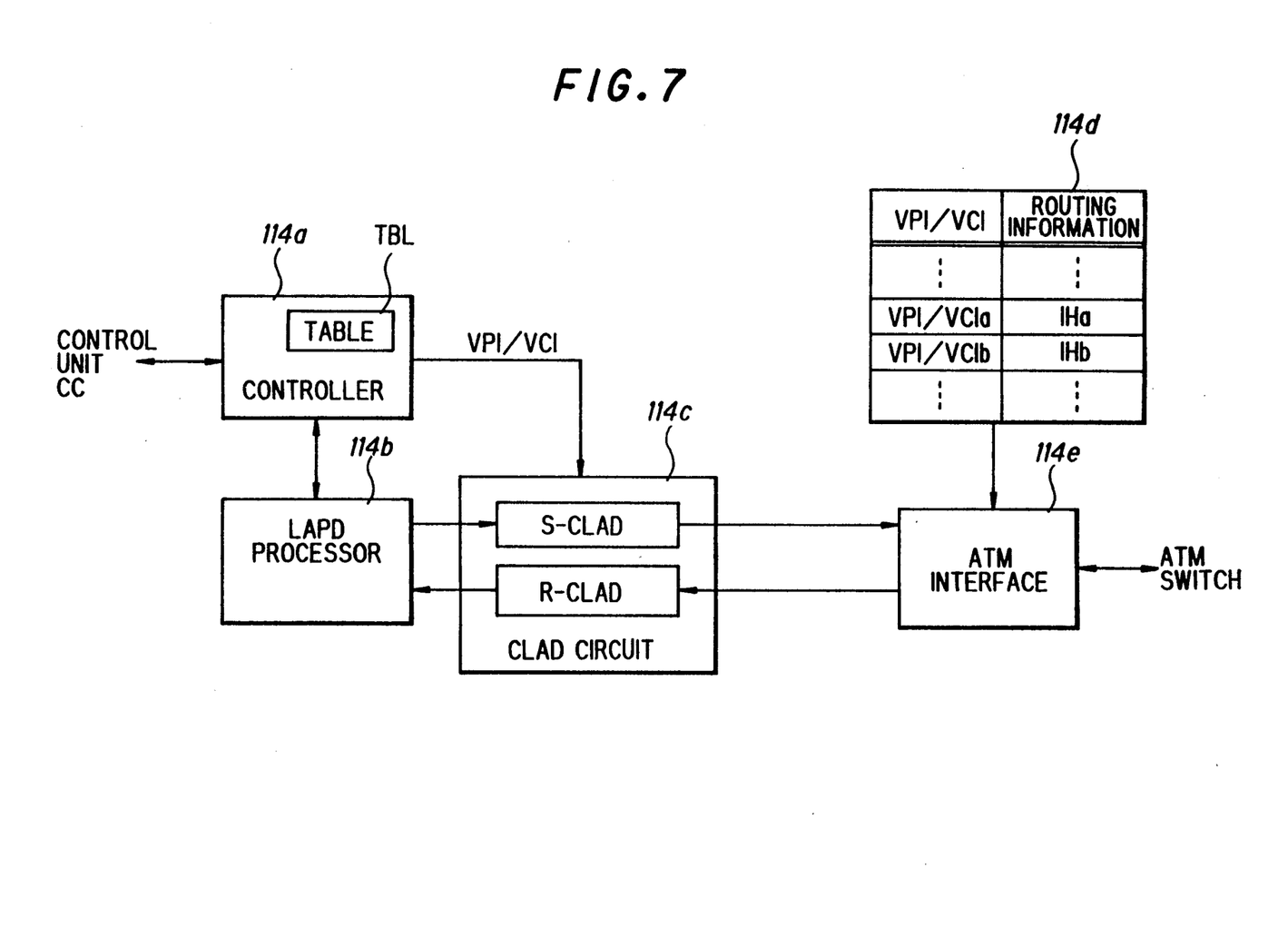
FIG. 7 is a block diagram illustrating ATM signaling unit.

As shown in FIG. 7, the ATM signaling unit 114 includes a controller 114a, an LAPD processor 114b for subjecting frame information to processing of layer 2 and transmitting the result, a CLAD circuit 114c for disassembling an ATM cell into a frame and assembling a frame into an ATM cell, a routing table 114d, and an ATM interface circuit 114e for adding routing information to the ATM cell inputted from the CLAD circuit and removing routing information from an ATM cell inputted from the ATM switch. A table TBL storing the correlation between a frame-relay module FRM of a frame destination and VCI/VPI is provided in the controller 114a. The CLAD circuit 114c is provided with a CLAD portion S-CLAD for transmission and a CLAD portion R-CLAD for reception. The CLAD portion S-CLAD for transmission assembles control-information frames inputted from the control unit (CC) 115 into cells and adds VPI/VCI corresponding to the frame-relay module of the destination to each cell. The CLAD portion R-CLAD for reception disassembles cells inputted from the ATM interface circuit 114e into frames for every VPI/VCI and outputs the frames. Routing information for routing an ATM cell to a prescribed frame-relay module is registered in the routing table 114d in correlation with VPI/VCI.

Overall Operation (a) Intra-FRM connection

In a case where a frame is transmitted from the terminal of LAN 121b (FIG. 2) to the terminal of the LAN 121c, by way of example, the FR router 122b adds the DLCI value conforming to the terminating destination to the frame and then inputs the frame to the FR interface circuit 141. The latter then refers to the logical-path setting table LPT and sends a data frame (C/D="0") having the construction shown at in FIG. 6(a) to the fast bus 151. It should be noted that the port address PA is the port address of the FR interface circuit 142.

Each of the FR interface circuits 141, 142, ... performs monitoring to determine whether the port address PA of a frame coincides with its own port address. If coincidence is found, then the FR interface circuit receives the frame. As a result, the frame is received by the FR interface circuit 142. On the basis of the identifier C/D, the FR interface circuit 142 distinguishes between a data frame and a control-information frame. In the case of a data frame, the FR interface circuit 142 removes the identifier C/D, then refers to the second table LPT$_2$ [see FIG. 10(b)] and obtains a DLCI value from the link address LA contained in the received frame. Thereafter, the FR interface circuit 142 removes the logical-path data (PA, LA), adds on the DLCI value and sends the resulting frame to the FR router 122c. The latter removes the DLCI value and transfers the frame to the LAN 121c. The terminal whose address coincides with the IP address contained in the frame receives the frame.

(b) External FRM Connection

In a case where a frame is transmitted from the terminal of the LAN 121b to the terminal of the LAN 121a, by way of example, the FR router 122b adds the DLCI value conforming to the terminating destination to the frame and then inputs the resulting frame to the FR interface circuit 141. The latter then refers to the logical-path setting table LPT and sends a data frame (C/D=0) having the construction shown at ≠ in FIG. 6(a) to the fast bus 151. It should be noted that the port address PA is 0.

The buffer 153 accept frames for which the port address PA is 0 and successively buffers frames for every identical destination (every identical VPI/VCI). The CLAD circuit 154 forms cells by gathering together the C/D, DPA, LA and data of the frames for every identical destination, adds the VPI/VCI to the header and then inputs the resulting cell to the ATM interface circuit 155. The latter adds routing information to the ATM cell inputted from the CLAD circuit 154 and then inputs the resulting cell to the ATM switch 111. The ATM switch 111 routes the ATM cell to the frame-relay module 132 based upon the routing information and inputs the resulting cell to the ATM interface circuit of the above-mentioned module. The ATM interface circuit of the frame-relay module 132 inputs the cell to the CLAD circuit upon removing the routing information, and the CLAD circuit disassembles the inputted ATM cell into a frame, as shown at ·· in FIG. 6(a) (the DPA is the port address PA) and then outputs the frame to the fast bus via the buffer. This is performed in successive fashion. Thereafter, in a manner similar to that for the case of the intra-FRM connection, this is accepted by the prescribed FR interface circuit, C/D, PA, LA are deleted, the DLCI value is added on instead and the resulting frame is inputted to the FR router 122a. The latter transfers the frame to the LAN 121a upon removing the DLCI value, and a terminal whose address coincides with the IP address contained in the frame receives the frame.

(c) Registration of Logical-Path Information

By way of example, assume that logical-path information is to be registered anew in the logical-path setting table LPT of the FR interface circuit 141. In such case, the following operations are performed using the console 116:

(1) the number of the frame-relay module 131 to which the FR interface circuit 141 belongs and the port address PA of this FR interface circuit are entered;

(2) the command CM for registering the logical-path information is entered; and (3) logical-path information to be registered ΛE in FIG. 6(b)] is entered.

As a result, the control unit (CC) 115 generates the control-information frame ·· (C/D=1) of FIG. 6(b) and inputs this frame to the signaling unit 114. It should be noted that PA at the head of the control-information frame ·· is the port address of the FR interface circuit 141 that has entered from the console. The control unit 115 inputs the number of the frame-relay module of the destination to the signaling unit 114.

The controller 114a of the signaling unit 114 inputs the control-information frame to the LAPD processor 114b, obtains the VPI/VCI corresponding to the frame-relay module of the destination from the table TBL and inputs this to the CLAD circuit 114c.

The LAPD processor 114b applies layer-2 processing to the entered control-information frame and inputs the result to the CLAD circuit 114c. The latter assembles the control-information frame into a cell, adds the VPI/VCI corresponding to the frame-relay module of the destination to the header of each cell and inputs the cell to the ATM interface 114e. The ATM interface 114e obtains the routing information corresponding to the VPI/VCI from the routing table 114d, adds the routing information to the ATM cell and applies the resulting cell to the ATM switch 111.

The ATM switch 111 routes the entered ATM cell to the frame-relay module 131 based upon the routing information and inputs the cell to the ATM interface circuit 155 of this module. The ATM interface circuit 155 removes the routing information and then applies the cell to the CLAD circuit 154. The latter disassembles the entered ATM cell into a frame, as indicated at ·· in FIG. 6(b), and successively outputs frames to the fast bus 151 via the buffer 153.

Each of the FR interface circuits 141, 142, ... performs monitoring to determine whether the port address PA of a frame coincides with its own port address. If coincidence is found, then the FR interface circuit receives the frame. As a result, the frame is received by the FR interface circuit 141. On the basis of the identifier C/D, the FR interface circuit 141 distinguishes between a data frame and a control-information frame. In the case of a control-information frame, the FR interface circuit 141 executes processing in accordance with command CM. If the frame is a data frame, the FR interface circuit 141 sends the data frame to the local fast bus. In this case, the frame is the control-information frame and the command CM is a command for registering logical-path information. Therefore, the processor 165 (FIG. 5) of the FR interface circuit 141 registers the logical-path information that follows the command in the logical-path setting table LPT. It should be noted that if a value identical with that of the DLCI of the received control-information frame has been registered in the table LPT, the value is overwritten to alter the contents.

Thus, if registration processing can be executed correctly, the processor 165 creates the control-information frame for response shown at ≠ in FIG. 6(b) and sends this frame to the fast bus 151. Since the PA of the control-information frame for response indicates the port address (=0) of the buffer 153, the latter accepts this control-information frame and buffers the frame. The CLAD circuit 154 assembles C/D, RS, ACK ... from the control-information frame into a cell, adds VPI/VCI attached to the control-information frame to the header and then inputs the resulting cell to the ATM interface circuit 155. The latter adds the routing information, for routing to the signaling unit 114, to the ATM cell that has entered from the CLAD circuit 154 and then inputs the resulting cell to the ATM switch 111. The latter routes the ATM cell to the signaling unit 114 based upon the routing information and inputs the ATM cell to the ATM interface 114e (FIG. 7). The ATM interface 114e removes the routing information and inputs the cell to the CLAD circuit 114c. The latter disassembles the entering ATM cell into a frame (C/D+RS+ACK ... ) and inputs the frame to the control unit 115 via the LAPD processor 114 and controller 114a. The control unit 115 recognizes that the control-information frame has been received and that registration of the logical-path information has been performed correctly, presents a display to this effect on the console and the concludes registration control.

It should be noted that if the FR interface circuit is incapable of correctly executing processing conforming to a command, i.e., if registration processing cannot be executed correctly, NACK is inserted in the control-information frame instead of ACK.

The foregoing is processing for registering logical-path information. However, deletion and other commands can be sent to the FR interface circuit in a control-information frame and processing can be executed in accordance with the prescribed command.

In accordance with the present invention, it is possible to dispense with a serial interface circuit for an exchange of data between the control unit and each of the FR interface circuits. Moreover, an exchange of control-information frames can be performed by hardware provided in an ATM switch as standard hardware. This makes it possible to reduce hardware. Further, since it suffices to distinguish a data frame from a control-information frame by an identifier, determine whether a frame is a data frame or control frame and then execute the prescribed processing, it is possible to simplify interface control.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling a frame-relay module having a plurality of frame-relay interface circuits, each of which is equipped with a logical-path setting table, for adding logical-path information to a frame, which has entered from a local fast bus, upon referring to said logical-path setting table, and for accepting a frame sent from another party and then sending the frame to the local fast bus, a cell assembly/disassembly circuit for assembling a frame into an ATM cell and disassembling an ATM cell into a frame, and an ATM interface circuit for sending an ATM cell that has entered from the cell assembly/disassembly circuit to an ATM switch and inputting an ATM cell, which has entered from the ATM switch, to the cell assembly/disassembly circuit, said method comprising the steps of:

outputting a control-information frame from a control unit connected to the ATM switch, said control-information frame containing data specifying a frame-relay interface circuit as well as a processing command;

assembling said control-information frame into an ATM cell and sending said ATM cell, via the ATM switch, to a frame-relay module in which the specified frame-relay interface circuit is present;

restoring the ATM cell to a control-information frame by the ATM interface circuit and cell assembly/disassembly circuit in the frame-relay module;

causing the specified frame-relay interface circuit to accept said control-information frame; and executing processing, which conforms to the command contained in the control-information frame, in the frame-relay interface circuit.

2. The method according to claim 1, further comprising the steps of:

distinguishing a data frame from a control-information frame by an identifier;

determining whether a frame accepted in the frame-relay interface circuit is a control-information frame or a data frame; and executing processing conforming to a command if a frame is a control-information frame and sending a data frame to the local fast bus if a frame is the data frame.

3. The method according to claim 2, wherein when the frame-relay interface circuit executes processing conforming to a command contained in a control-information frame, a control-information frame containing results of processing is sent to the control unit via the ATM switch.

4. The method according to claim 1, wherein if logical-path information is to be registered in a logical-path setting table possessed by a frame-relay interface circuit, the control unit outputs a control-information frame having data specifying the frame-relay interface circuit, the logical-path information to be registered and a registration command, and the frame-relay interface circuit accepts said control-information frame and registers the logical-path information contained in the control-information frame in the logical-path setting table.

5. A method of controlling a frame-relay module having a plurality of frame-relay interface circuits, each of which is equipped with a logical-path setting table, for adding logical-path information to a frame, which has entered from a local fast bus, upon referring to said logical-path setting table, and for accepting a frame sent from another party and then sending the frame to the local fast bus, a cell assembly/disassembly circuit for assembling a frame into an ATM cell and disassembling an ATM cell into a frame, and an ATM interface circuit for sending an ATM cell that has entered from the cell assembly/disassembly circuit to an ATM switch and inputting an ATM cell, which has entered from the ATM switch, to the cell assembly/disassembly circuit, said method comprising the steps of:

entering, from a console, a port address PA of a frame-relay interface circuit, data specifying a frame-relay module to which said frame-relay interface circuit belongs, a processing command and processing data;

outputting, from a control unit, a control-information frame containing a port address PA, a processing command and processing data;

assembling said control-information frame into an ATM cell and adding VPI/VCI, which conforms to said frame-relay module, to said ATM cell;

routing the ATM cell to a frame-relay module based upon the VPI/VCI;

restoring the ATM cell to a control-information frame by the ATM interface circuit and cell assembly/disassembly circuit in said frame-relay module, and sending the control-information frame to a bus to which each frame-relay interface circuit is connected;

causing a frame-relay interface circuit, to which a port address identical with the port address contained in the control-information frame has been assigned, to accept said control-information frame; and executing processing, which conforms to the command contained in the control-information frame, in the frame-relay interface circuit.

6. The method according to claim 5, further comprising the steps of:

distinguishing a data frame from a control-information frame by an identifier;

determining whether a frame accepted in the frame-relay interface circuit is a control-information frame or a data frame; and executing processing conforming to a command if a frame is a control-information frame and sending a data frame to the local fast bus if a frame is the data frame.

7. The method according to claim 6, wherein when the frame-relay interface circuit executes processing conforming to a command contained in a control-information frame, a control-information frame containing results of processing is sent to the control unit via the ATM switch.

8. The method according to claim 5, wherein if new logical-path information is to be registered in a logical-path setting table possessed by a frame-relay interface circuit, said processing command is a registration command and said processing data is the logical-path information to be registered.

9. A high-speed switching system having a plurality of frame-relay interface circuits, each of which is equipped with a logical-path setting table, for adding logical-path information to a frame, which has entered from a local fast bus, upon referring to said logical-path setting table, and for accepting a frame sent from another party and then sending the frame to the local fast bus, a cell assembly/disassembly circuit for assembling a frame into an ATM cell and disassembling an ATM cell into a frame, and an ATM interface circuit for sending an ATM cell that has entered from the cell assembly/disassembly circuit to an ATM switch and inputting an ATM cell, which has entered from the ATM switch, to the cell assembly/disassembly circuit, said system comprising:

input means for entering a port address PA of a frame-relay interface circuit, data specifying a frame-relay module to which the frame-relay interface circuit belongs, a processing command and processing data;

a control unit for creating and outputting a control-information frame containing a port address PA, a processing command and processing data;

an ATM signaling unit for assembling the control-information frame into an ATM cell and adding a VPI/VCI, which conforms to the frame-relay module, to said ATM cell;

an ATM switch for routing the ATM cell to a frame relay module based upon the VPI/VCI;

means provided in the frame-relay module for restoring the received ATM cell to a control-information frame and sending said control-information frame to a bus to which each frame-relay interface circuit is connected; and a frame-relay interface circuit, to which a prescribed port address has been assigned, for accepting a control-information frame containing a port address identical with the said prescribed port address and executing processing conforming to a command contained in this control-information frame.

10. The system according to claim 9, wherein if new logical-path information is to be registered in a logical-path setting table possessed by the frame-relay interface circuit, said processing command is a registration command and said processing data is the logical-path information to be registered.

* * * * *